US008084004B2

(12) United States Patent
Peters et al.

(10) Patent No.: US 8,084,004 B2
(45) Date of Patent: Dec. 27, 2011

(54) MICROFLUIDIC ARRANGEMENT FOR METERING OF LIQUIDS

(75) Inventors: Ralf-Peter Peters, Bergisch-Gladbach (DE); Gert Blankenstein, Dortmund (DE); Dirk Osterloh, Unna (DE)

(73) Assignee: Boehringer Ingelheim Microparts GmbH, Dortmund (DE)

( * ) Notice: Subject to any disclaimer, the term of this patent is extended or adjusted under 35 U.S.C. 154(b) by 906 days.

(21) Appl. No.: 10/762,563

(22) Filed: Jan. 23, 2004

(65) Prior Publication Data

US 2004/0209381 A1   Oct. 21, 2004

(30) Foreign Application Priority Data

Jan. 23, 2003   (DE) .................................. 103 02 721

(51) Int. Cl.
*G01N 1/18* (2006.01)
(52) U.S. Cl. ........ 422/507; 422/68.1; 422/503; 436/180
(58) Field of Classification Search ................. 422/68.1, 422/81, 82, 100, 101, 102, 103, 99; 436/43, 436/53, 174, 180
See application file for complete search history.

(56) References Cited

U.S. PATENT DOCUMENTS

| | | | |
|---|---|---|---|
| 5,230,866 A | | 7/1993 | Shartle et al. |
| 5,872,010 A | * | 2/1999 | Karger et al. ................. 436/173 |
| 6,063,589 A | * | 5/2000 | Kellogg et al. ................. 435/24 |
| 6,117,396 A | | 9/2000 | Demers |
| 6,143,248 A | * | 11/2000 | Kellogg et al. ................. 422/72 |
| 6,395,232 B1 | * | 5/2002 | McBride ........................ 422/100 |
| 6,465,225 B1 | * | 10/2002 | Fuhr et al. .................... 435/173.1 |
| 7,144,743 B2 | * | 12/2006 | Boschetti et al. ............. 436/528 |
| 2002/0150512 A1 | * | 10/2002 | Kellogg et al. ............... 422/103 |
| 2002/0195463 A1 | * | 12/2002 | Seki et al. .................... 222/134 |

(Continued)

FOREIGN PATENT DOCUMENTS

WO    WO 01/74490 A2    10/2001

(Continued)

*Primary Examiner* — In Suk Bullock
*Assistant Examiner* — Timothy G Kingan
(74) *Attorney, Agent, or Firm* — Welsh Flaxman & Gitler LLC

(57) ABSTRACT

The invention relates to a microfluidic arrangement for metering one or more first metered amounts of liquid (A) and for separating the latter from a second amount of liquid (B), having the following features: the arrangement has a first channel and one or more second channels; the first channel has one inlet and one outlet; in the area of the outlet the arrangement has a capillarity, which is greater than or equal to the capillarity in the area of the inlet; the one or more second channels branch off from the first channel at one or more branch points; the one or more second channels have a greater capillarity than the first channel at the branch points; and the one or more second channels have a predetermined volume. In the arrangement as depicted in the invention a liquid is transported in the first channel from the inlet to the outlet. At the branch points one portion of the liquid at a time enters the one or more second channels and fills them completely with the first metered amounts of liquid (A). The portion of the liquid remaining after the last branch point in the first channel emerges as the second amount of liquid via the outlet from the first channel. The amounts of liquid (A) metered in the one or more second channels are separated from the remaining amount of liquid (B) by a gas, which is located in the first channel after filling all one or more second channels.

7 Claims, 5 Drawing Sheets

U.S. PATENT DOCUMENTS

| | | | |
|---|---|---|---|
| 2003/0005967 A1* | 1/2003 | Karp | 137/806 |
| 2003/0044322 A1* | 3/2003 | Andersson et al. | 422/100 |
| 2003/0141473 A1* | 7/2003 | Pelrine et al. | 251/129.06 |
| 2003/0152927 A1* | 8/2003 | Jakobsen et al. | 435/6 |

FOREIGN PATENT DOCUMENTS

| | | |
|---|---|---|
| WO | WO 01/78893 A2 | 10/2001 |
| WO | WO 02/11888 A2 | 2/2002 |

* cited by examiner

MICROFLUIDIC ARRANGEMENT FOR METERING OF LIQUIDS

BACKGROUND OF THE INVENTION

This invention relates to a microfluidic arrangement for metering and separating one or more first metered amounts of liquid from a second amount of liquid.

The existing art discloses various such microfluidic arrangements. These microfluidic arrangements are used for example for metering and injecting liquids for wet chemical, biochemical and diagnostic analyses. Here, among others, volumetric elements are filled with a defined first liquid amount. This defined amount of liquid is separated from a excess second amount of liquid. Currently the separation of the excess amount of liquid from the metered amount of liquid takes place generally by mechanical elements or by a gaseous phase. The gaseous phase can be obtained by exhausting the excess amount of liquid. It is likewise possible for the excess amount of liquid to be "blown away" from the metered amount of liquid by means of a pressure surge.

One disadvantage in the existing microfluidic arrangements for metering and separating by means of a gaseous phase is that to produce the negative pressure or the overpressure (exhaust or blow away) for separation of the first from the second amount of liquid there must be pressure generation means which produce the necessary pressure surge. Conversely, for metering itself a pressure surge is not necessary since the amount of liquid, which is to be metered, is often added to the metered volume via capillary. This is disclosed for example in publication WO 99/46 045. Basically the metering could also take place with pressure generation means by suction or blowing in. This possibility however proved complicated in the past and where possible it is being replaced by filling by means of capillary.

SUMMARY OF THE INVENTION

Against the background of these disadvantages of the arrangements from the art, an object of the invention is to propose a microfluidic arrangement in which the separation of one or more metered first liquid amounts from a generally excess second liquid amount is achieved without pressure generation means.

The invention is based on the idea of using capillary for separation of the metered liquid amount from an excess liquid amount. Thus a microfluidic arrangement as depicted in the invention has a first channel and one or more second channels. The first channel has one inlet and one outlet. In the area of the outlet there is a greater capillary than in the area of the inlet. The second channels branch off from the first channel at one or more branch points. Here the second channels have a greater capillary than the first channel at the branch points. Furthermore the second channels have a predetermined volume. The channels of the microfluidic arrangement are designed accordingly for transport of liquids. This applies for example with respect to the cross sectional areas, the cross sectional arrangement, the surface composition, and the like. A channel can otherwise be a groove or a trough in the surface, which is preferably closed with a cover. Likewise it is possible for the channel to be made as a tube. A channel for the purposes of the invention can fundamentally be any structure, which is suited for routing a liquid or a gas in one certain direction during transport.

The metering and the separation take place such that a liquid amount at the inlet is sucked into the first channel as a result of the capillary which is present at the inlet, and is transported in the direction of the outlet. On the route from the inlet to the outlet, part of the amount of liquid transported into the first channel is transported at the branch point into the second channel since the second channel in the area of the branch point has a greater capillary than the first channel. The second channel is thus filled with the liquid until the defined volume of the second channel is completely filled. The amount of liquid which is still at the inlet or which is still contained in the first channel is then transported as a result of capillary within the first channel to its outlet. If the entire excess amount of liquid is transported to the outlet, there is a gaseous phase in the first channel. The metered amount of liquid in the second channel is fluidically separated from the excess amount of liquid via this gaseous phase.

The higher capillary of the second channel compared to the first channel at the branch point can be achieved by a sudden change of the geometrical properties at the transition from the first channel to the second channel or a sudden change of the surface properties of the wall at the transition. One measure of the capillary at the transition is the pressure difference which can be computed using the following formula, as was also given for example in a publication of Hosokawa et al. (K. Hosokawa, T. Fujii, and I. Endo, "Hydrophobic Microcapillary vent for pneumatic manipulation of liquid in µTas", Proc. "Micro Total Analysis Systems '98", pp. 307-310, Banff, Canada.):

$$\Delta P = -2\gamma \cos\theta (1/w + 1/h - 1/W - 1/H),$$

$\gamma$ and $\theta$ denoting the surface tension of the liquid and the edge angle between the liquid and the walls and w and h denoting the dimensions of the channel downstream of the transition and W and H denoting the dimensions of the channel upstream of the transition.

As depicted in the invention the microfluidic arrangement can have an inlet reservoir which is connected upstream of the inlet of the first channel. This inlet reservoir as depicted in the invention can have a smaller capillary than the first channel in the area of the inlet.

Furthermore, the microfluidic arrangement can have an outlet reservoir which is connected downstream of the outlet of the first channel. This outlet reservoir advantageously has a greater capillary than the first channel in the area of the outlet.

The first channel of the microfluidic arrangement as depicted in the invention can be divided into sections between the inlet and the outlet so that the first channel forms a first channel system. Advantageously then the sections of the first channel system can have a capillary which increases from the inlet to the outlet.

Likewise as depicted in the invention the second channels can be divided into sections so that the second channels form a second channel system, the capillary of these sections of the second channel systems advantageously increasing from the branch points to the means for stopping.

Following the stopping means one third channel at a time can be connected to the second channels. A microfluidic arrangement as depicted in the invention however can also be made such that a common third channel is connected to the second channels. In the third channel for example a reaction chamber can be formed in which there are reagents. The metered liquid, which is contained in the second channel, can be transported into the third channel where the metered liquid then reacts with the reagents in the reaction chamber and the desired product is formed.

For transport into the third channels the capillary of the third channels can be greater than that of the second channels.

As depicted in the invention the stopping means can be capillary stops, microvalves or other suitable stopping means.

The microfluidic arrangement following the third channels can have one second outlet each, via which for example the product can be removed from the microfluidic arrangement. Likewise it is possible to vent the microfluidic arrangement and especially the second and the third channel via this second outlet. Furthermore another reaction channel or the like can be connected to the arrangement as depicted in the invention via the second outlet.

In a microfluidic arrangement, individual or all sections of the first channel system, of the second channel systems and/or of the third channel systems can be made meander-shaped, as cavities and/or with an absorbent material. Furthermore the microfluidic arrangement in the area of the branch point can be connected to an aeration channel.

BRIEF DESCRIPTION OF THE DRAWINGS

Embodiments for a microfluidic arrangement as depicted in the invention for metering and for separating a first amount of liquid from a second amount of liquid are described using the following drawings.

DETAILED DESCRIPTION OF THE INVENTION

The embodiments shown in FIG. 1 to FIG. 8c for microfluidic arrangements can be part of a larger overall arrangement. They can be provided for example with other microfluidic arrangements for the same or also for other purposes on a sample carrier, for example made of plastic or silicon, especially a microtiter plate.

Figure 8A:
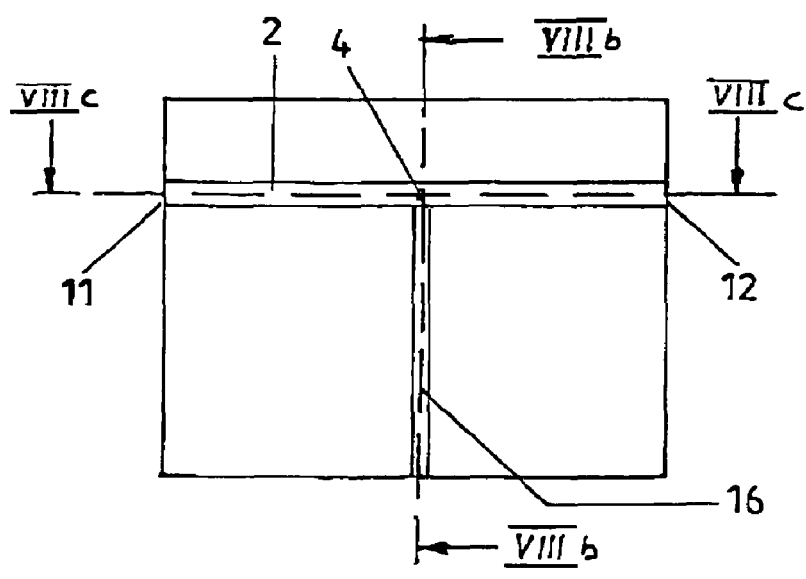
FIGS. 8a to 8c show a third simplified embodiment.
Figure 8B:
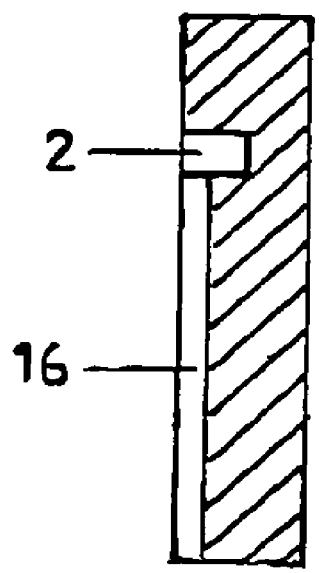
Figure 8C:
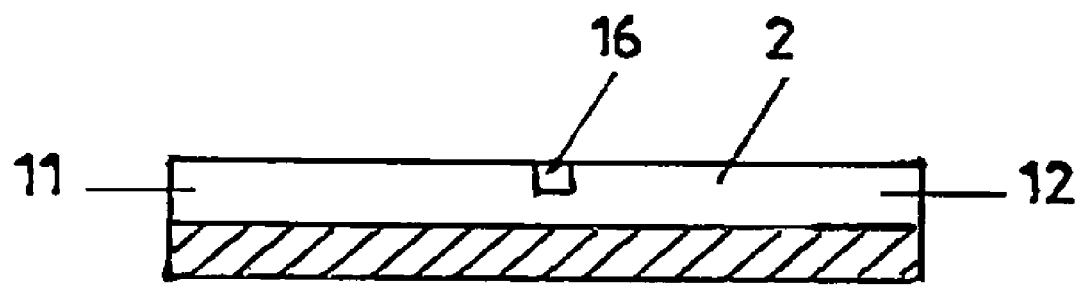

The principle underlying the invention will be explained using the simplified embodiment as shown in FIGS. 8a to 8c. The microfluidic arrangement as shown in FIGS. 8a to 8c has a first channel 2 with one inlet and one outlet 12. At the branch point 4 of the first channel 2 between the inlet 11 and the outlet 12 a second channel 16 branches off from the first channel 2. This second channel 16 at the branch point 4 has a greater capillarity than the first channel 2. Furthermore the second channel 16 has an exactly defined volume. A liquid, which is delivered into the first channel 2 via the inlet 11, is transported to the branch point 4 as a result of the capillarity, which act in the first channel 2. Due to the greater capillarity of the second channel 16 compared to the first channel 2 at the branch point 4 part of the liquid at the branch point 4 is transported into the second channel 16 until the second channel 16 is completely filled with liquid. The second channel 16 at this instant contains a first exactly metered amount of liquid. Another part of the liquid, which is delivered at the inlet 11 into the first channel 2, is transported beyond the branch point 4 in the direction to the outlet 12. As soon as additional liquid ceases to enter the first channel 2 at the inlet 11, a gas bubble migrates into the first channel 2. Sooner or later it reaches the branch point 4. As soon as this gas bubble has passed the branch point 4, the second amount of liquid, which is upstream of the gas bubble in the transport direction, is fluidically separated from the first amount of liquid, which is contained exactly metered in the second channel 16. The second amount of liquid, which has been transported out in the first channel via the branch point 4, emerges from the first channel 2 at the outlet 12 after it has reached the outlet 12.

Figure 1:
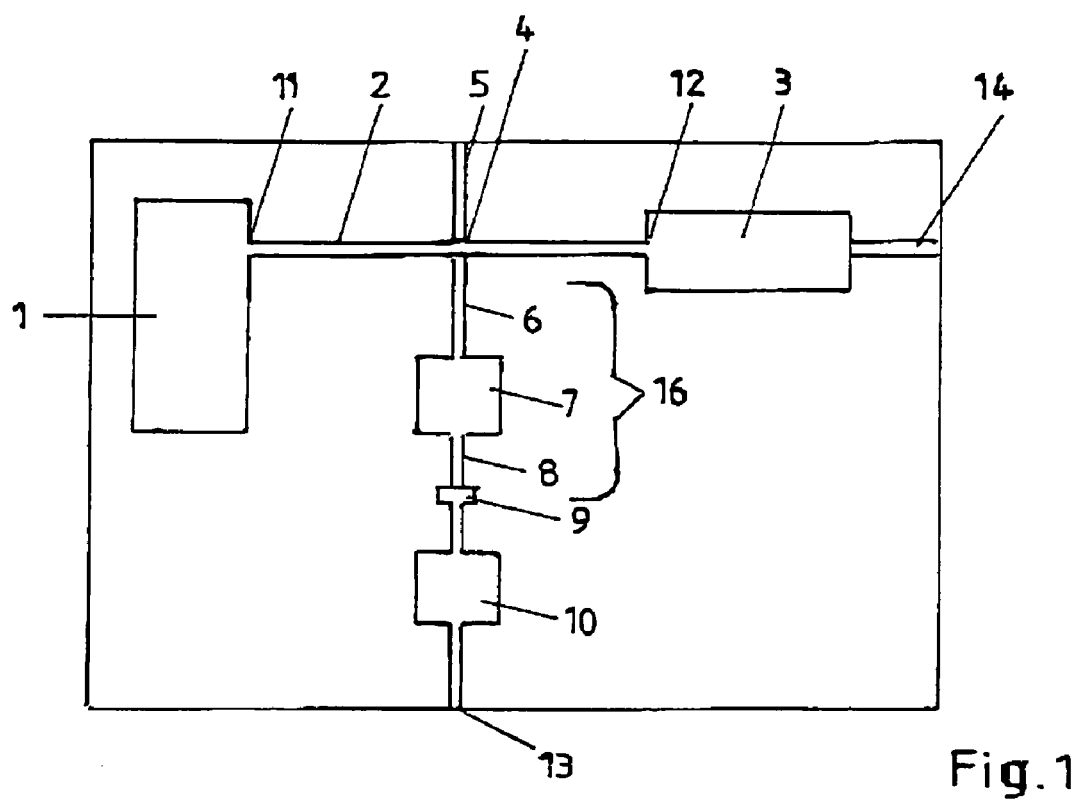
FIG. 1 shows a schematic of one simple embodiment.
Figure 2:
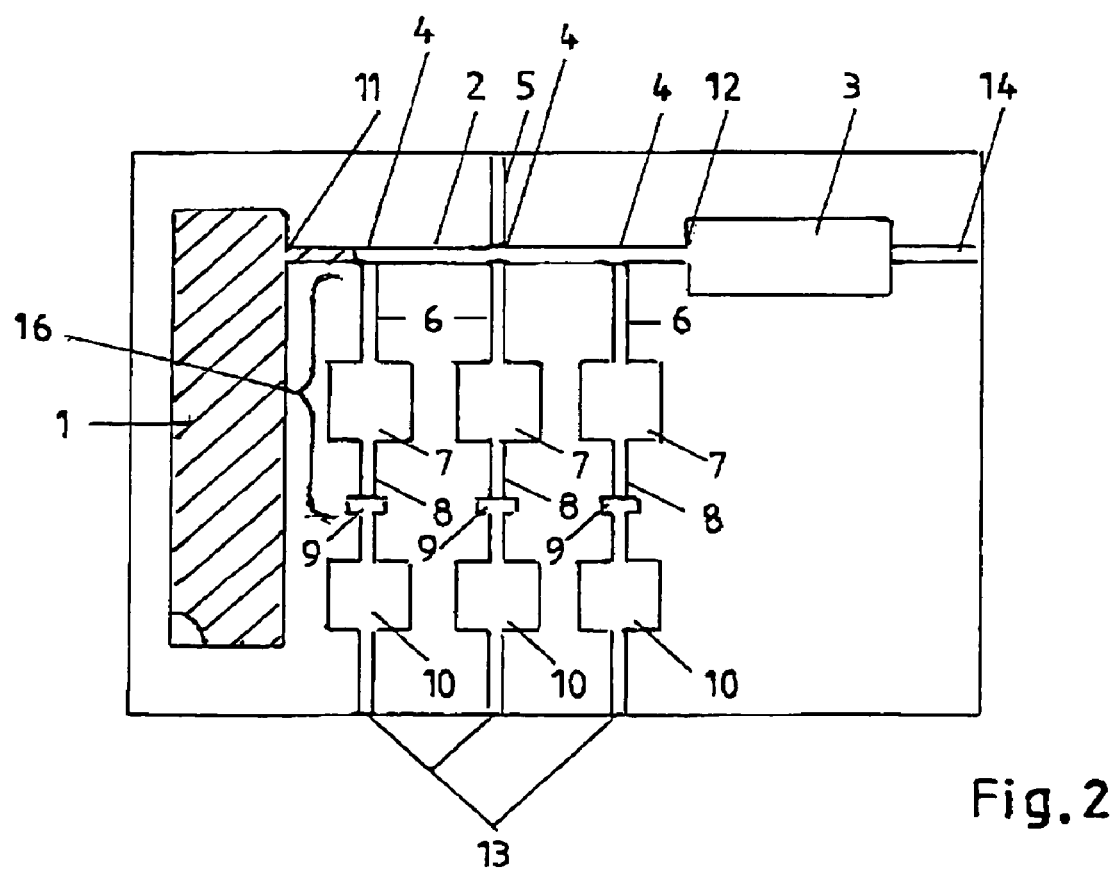
FIG. 2 to FIG. 7 show a second embodiment in different states of filling.

The example shown in FIG. 1 for a microfluidic arrangement has a first channel 2, a second channel 16 and a third channel 10. Here both the first channel 2, the second channel 16 and also the third channel 10 have several sections, for which reason the channels 2, 16, 10 below are called the first channel system 2, the second channel system 16 and the third channel system 10 respectively. Furthermore the first embodiment has an inlet reservoir 1, an outlet reservoir 3 and an aeration channel 5. Instead of the aeration channel 5, to aerate the channel systems aeration can also take place via the inlet reservoir 1 which is connected to the environment for filling with a liquid in a manner, which is not shown. The enumerated components of the first embodiment of a microfluidic arrangement are provided as cavities in a sample carrier. The cavities are arranged as recesses, troughs or grooves in the surface of the sample carrier. This surface of the sample carrier is then covered by means of a film or foil, a cover or the like. For a microfluidic arrangement as depicted in the invention however also other implementations which are familiar to one skilled in the art can be chosen, as the formation of recesses and/or grooves in the surface of a sample carrier.

The inlet reservoir 1 can be filled from the outside with a liquid via an opening, which is not shown. The first channel system 2, which consists of a channel, an inlet 11 and an outlet 12 between which the channel extends, is connected to this inlet reservoir. The inlet reservoir 1 is connected via the inlet 11 to the first channel system 2. Then the outlet reservoir 3 is connected to the outlet 12 of the first channel system 2. This outlet reservoir 3 is connected to the environment via a ventilation channel. Instead, the outlet reservoir 3 can be vented via holes, channels or the like in the cover. Between the inlet and the outlet 12 the second channel system branches off from the channel of the first channel system 2 at one branch point 4. The shape and the area of the cross section of the channels at the branch point 4 in the transition from the first channel system 2 to the second channel system 16 changes suddenly. A flat and broad channel passes into a deep narrow channel at these points, viewed in the transport direction.

The second channel system 16 consists of three sections 6, 7, 8, specifically a first section 6 which is made as a groove and thus forms a channel, a second section 7 which is made as a recess, and a third section 8 which is made as a groove and thus forms a channel. Here the first section 6 is connected to the first channel system 2 at the branch point 4. This first section 6 is connected to the second section 7, which is connected then in turn to the third section 8. The channel, which forms the third, section 8 discharges into a capillary stop 9. This capillary stop 9 is then connected to the third channel system 10 which consists essentially of a recess which is connected via two channels on the one hand to the capillary stop 9 and on the other hand to the second outlet 13 which discharges into the environment. Furthermore, the second channel system 6, 7, 8 and/or the third channel system 10 can be provided with a ventilation and aeration channel.

In addition to the second channel system 6, 7, 8 the aeration channel 5, which with its other end discharges into the environment, branches off at the branch point 4.

The individual channel systems of the embodiment have a different capillarity. Thus especially the capillarity of the second channel system 16 at the branch point 4 is greater than the capillarity of the first channel system 2 at this branch point 4. Moreover the capillarity of the first channel system 2 is greater than the capillarity of the inlet reservoir 1. Conversely, on the other hand the capillarity of the first channel system 2 is less than or equal to that of the outlet reservoir 3. Within the second channel system 16 the sections 6, 7, 8 can have the same capillarity. But it is also advantageously such that the capillarity of the third section 8 is greater than that of the second section 7, and that of the second section 7 is greater than that of the first section 6. The aeration channel 5 advantageously has a capillarity which is smaller than that of the first channel system 2. Likewise the ventilation channel 14 advantageously has a capillarity which is less than that of the outlet reservoir 3.

The volume of the inlet reservoir 1 is less than or equal to the sum of the volumes of the outlet reservoir 3 and of the second channel system 16.

If at this point the inlet reservoir 1 is filled with a liquid, the following takes place: As a result of the higher capillarity in the first channel system 2, the liquid contained in the inlet reservoir 1 is transported into the second channel system 2 which is filled from the inlet 11 in the direction of the branch point 4. As soon as the liquid has reached the branch point 4, the liquid flow is divided. As a result of the higher capillarity of the second channel system 16 some of the liquid, which is flowing from the inlet 11 into the first channel system 2, is conveyed into the second channel system 16. Another much smaller part of the liquid, which is flowing into the second channel system 2, is transported beyond the branch point 4 into the second channel system 2 to its outlet 12. The capillarity are thus chosen to one another such that the liquid which is flowing into the second channel system 16 has completely filled this second channel system 16 before the inlet reservoir 1 and the part of the first channel system 2 which is located between the inlet 11 and the branch point 4 are completely emptied of liquid. I.e., at the instant at which the liquid flowing into the second channel system 16 has reached the capillary stop liquid is still contained in the first channel system 2 at the branch point 4. In this way the predetermined volume of this second channel system 16 can be completely filled, by which an exactly metered volume of liquid is established in this second channel system 16. But it is likewise also conceivable for the first channel system 2 in the area of the branch point 4 to no longer contain any liquid if the second channel system is completely filled.

If the second channel system 16 is completely filled with liquid, thus no further liquid can flow into the second channel system 16. The liquid still contained in the inlet reservoir and/or in the first channel system 2 between its inlet and the branch point 4 is then transported by the capillarity of the first channel system 2 to the outlet reservoir 3, the portion of liquid in the first channel system breaking away from the portion of liquid which is in the second channel system as soon as a gas, for example, air, enters the inlet 11 instead of liquid. The liquid portion in the first channel system 2 is then sucked completely out of the first channel system 2 as a result of the higher capillarity of the outlet reservoir 3 relative to the first channel system 2. The air, which is displaced in the outlet reservoir 3 in doing, so is transported via the ventilation channel 14 out of the outlet reservoir 3.

As soon as any amount of liquid has been transported out of the inlet reservoir 1 and the first channel system 2 into the second channel system 16 or into the outlet reservoir 3, there are two amounts of liquid which have been separated from one another in the second channel system 6, 7, 8 on the one hand and the outlet reservoir 3 on the other. The amount of liquid initially added to the inlet reservoir 1 is metered relatively inexactly. Conversely, after liquid transport out of the inlet reservoir 1 into the second channel system 16 or the outlet reservoir 3 the amount of liquid A contained in the second channel system 16 is exactly defined based on the predetermined volume of this channel system. Conversely, an undefined excess amount of liquid B is contained in the outlet reservoir 3. The two amounts of liquid which are contained in the microfluidic arrangement, specifically the metered amount of liquid A contained in the second channel system 6, 7, 8 and the unmetered amount of liquid B contained in the outlet reservoir 3, are fluidically separated from one another by the gaseous phase which is contained in the first channel system 2.

The liquid contained in the defined volume of the second channel system 6, 7, 8 can then be transported into the third channel system 10 after the action of the capillary stop 9 has been neutralized. This is described in greater detail using FIG. 7 for the second embodiment.

The second embodiment, which is shown in FIGS. 2 to 6, corresponds in large parts to the first embodiment shown in FIG. 1. Therefore the same components of the microfluidic arrangements as shown in FIG. 1 and FIG. 2 to FIG. 6 are provided with the same reference numbers. The first embodiment and the second embodiment differ simply in that in the second embodiment there are several, specifically three second channel systems 16 and three third channel systems 10. Moreover the inlet reservoir 1 is made distinctly larger, the volume of the inlet reservoir 1 here also being less than or equal to the sums of the volumes of the second channel systems 16 and of the second outlet reservoir 3.

The three second channel systems 16 branch off at the branch points 4 in the direction from the inlet 11 to the outlet 12 in succession from the channel of the first channel system 2. The first sections 6 of the second channel system 16 are each connected to the branch points 4. These first sections 6 of the channel system then discharge, as already known from the first embodiment, into a second section 7 which then discharges into the third section 8. The third section 8 of the second channel system 16 then ends at one capillary stop 9 at a time. A third channel system 10 which discharges into one second outlet 13 at a time is then connected downstream of the capillary stop 9.

Figure 3:
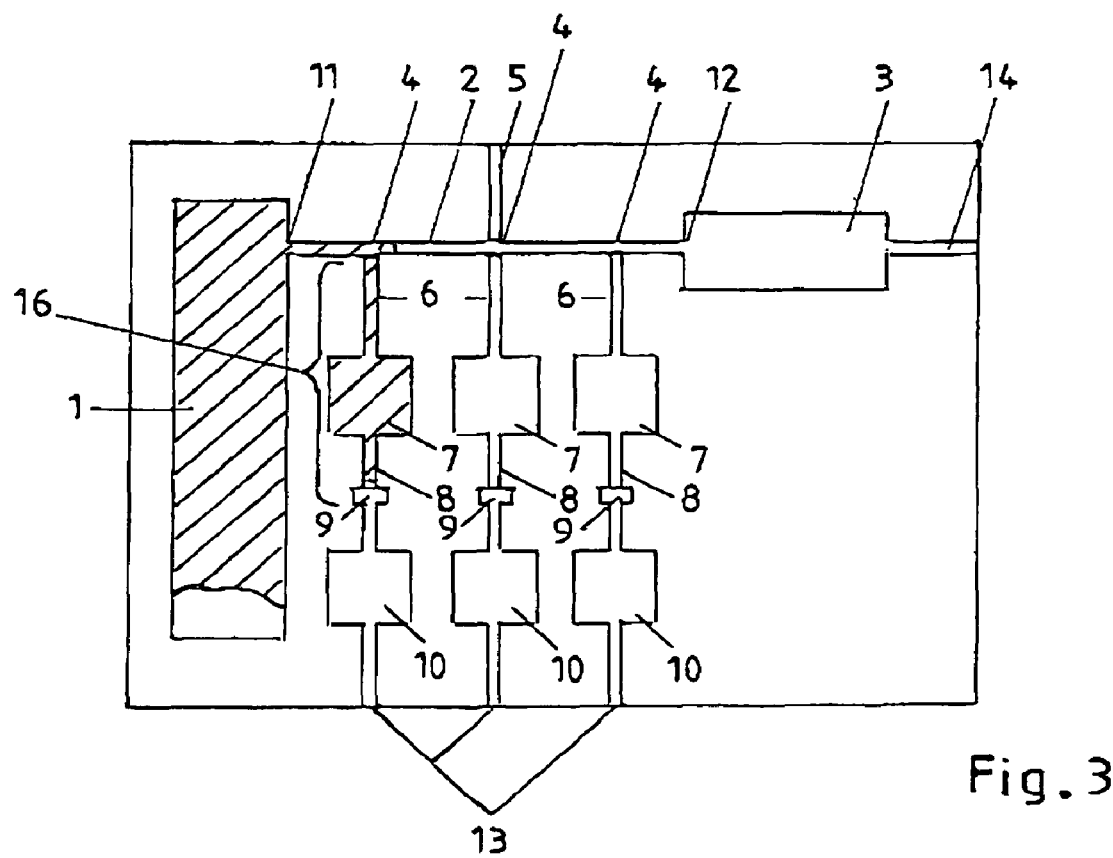
Figure 4:
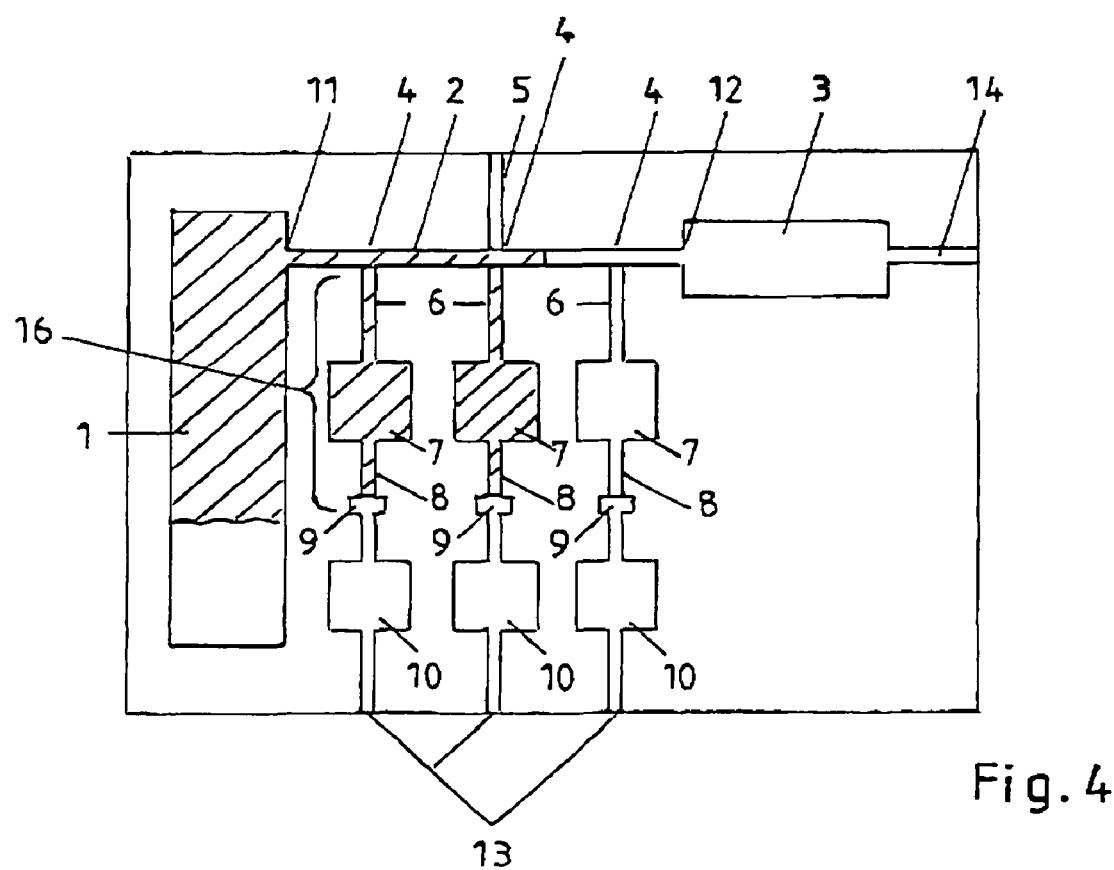
Figure 5:
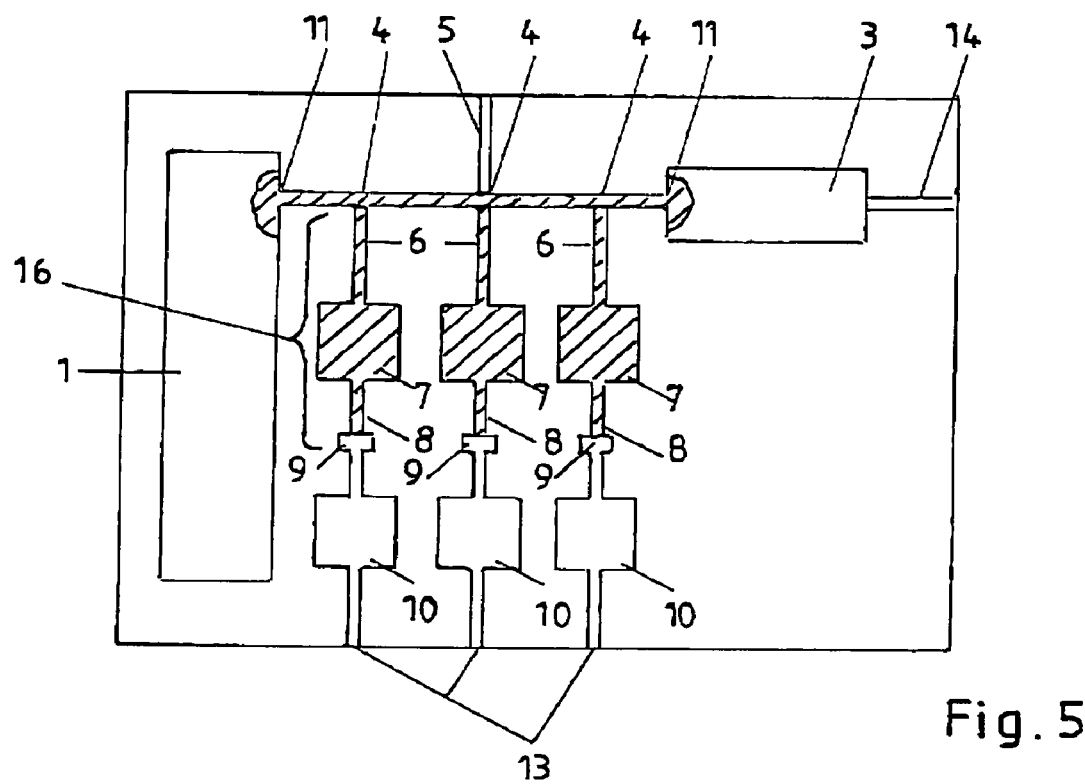
Figure 6:
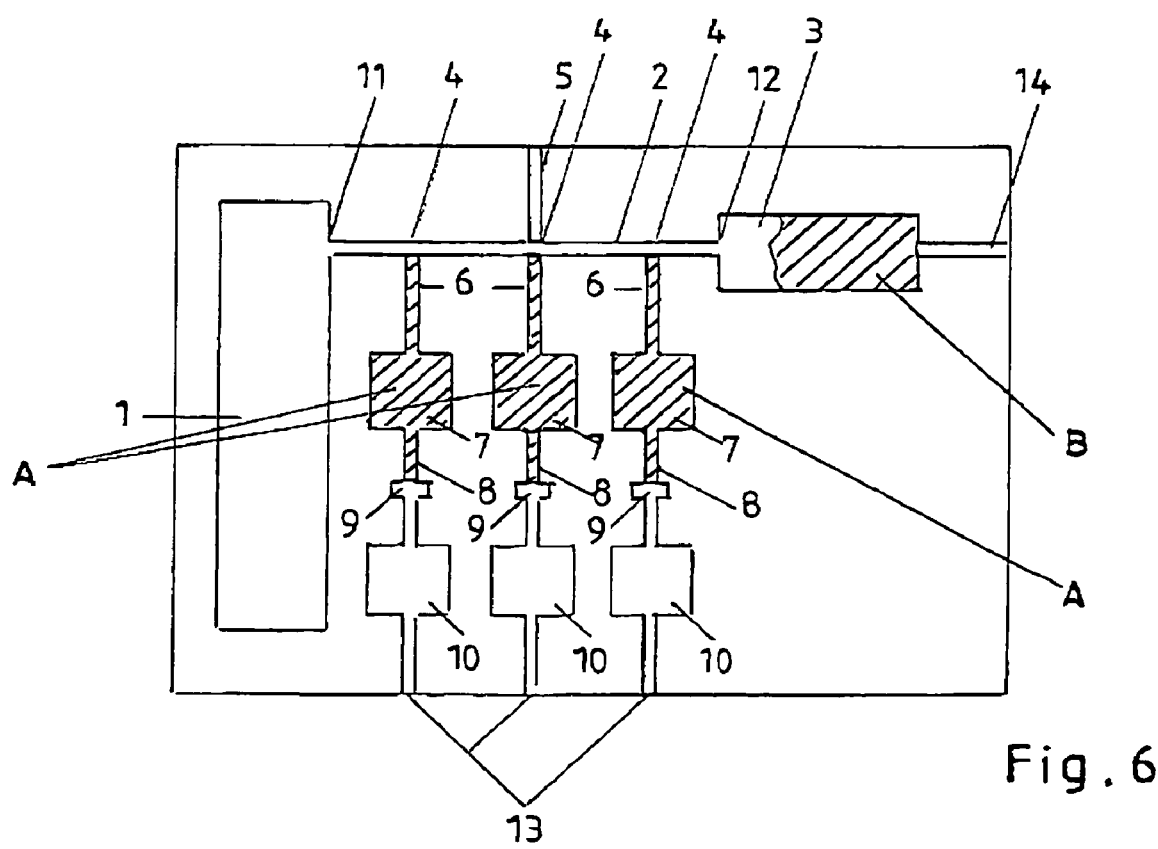
Figure 7:
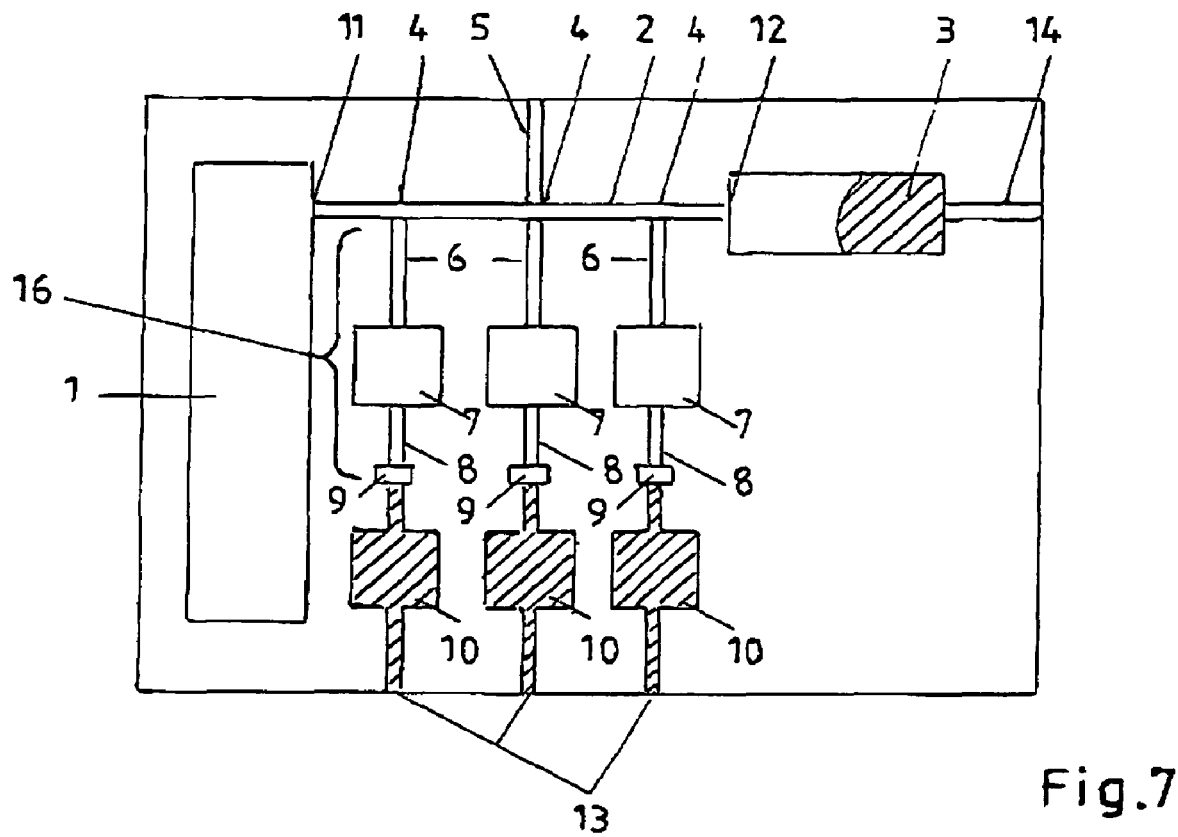

If at this point in the second embodiment as shown in FIG. 2 to FIG. 6 the inlet reservoir 1 is filled with liquid from the outside, this liquid enters the first channel system 2 at the inlet 11. As a result of the acting capillarity the liquid is drawn into the channel of the first channel system 2 (FIG. 2) until it reaches the first branch point 4. At this point a liquid flow branches into the second channel system 16, which is located at left in the drawing. This left second channel system 16 is completely filled with liquid. Only then is the liquid clearly advanced further in the channel of the first channel system 2 (FIG. 3). As soon as it reaches the branch point 4, which is located in the middle, another liquid flow branches off from the flow in the channel of the first channel system 2 into the second channel system 16, which is located in the middle (FIG. 4). As soon as the latter is completely filled up to the capillary stop 9, and the liquid flow in the channel of the first channel system 2 has reached the right branch point 4, the right second channel system 16 is filled. If it is also completely filled with liquid, the remaining liquid located in the channel of the first channel system 2 and optionally the liquid remaining in the inlet reservoir 1 is transported into the outlet reservoir 3 as a result of capillarity (FIG. 5), the air displaced in the outlet reservoir 3 being able to escape via the ventilation channel 14.

In the second embodiment shown in FIGS. 2 to 7 the defined volumes of the second channel systems 16 are filled essentially in succession. By the corresponding configuration of the channels of the first sections 6 of the second channel systems 16 and by the corresponding configuration of the first channel system the capillarity however can also be set such that the second channel systems 16 are filled roughly at the same time. In doing so the liquid, which is flowing in the first channel system 2, does not remain in the branch points up to complete filling, but is transported without major delay as far as the first outlet 13. As soon as the liquid has reached the branch points 4, then filling of the second channel system 16, which was excluded at the respective branch point 4, begins.

In the second embodiment as shown in FIG. 2 to FIG. 6 thus in the temporary end state (FIG. 6) the liquid B which is in the outlet reservoir 3 is fluidically separated from the metered liquids A which are located in the second channel system 6, 7, 8 by a gaseous phase.

Both in the first embodiment as shown in FIG. 1 and also in the second embodiment as shown in FIG. 2 to FIG. 6 the recesses of the third channel systems 10 are made as reaction chambers. I.e., the reagents are placed in these recesses. By applying a negative pressure to the second outlets 13 of the microfluidic arrangements, by producing a short overpressure in the third sections 8 of the second channel systems 16, (for example by mechanically pressing on the cover of the microfluidic arrangement in the area of the third sections 8, by local heating, by means of piezoelectric elements or the like), the capillary stops 9 can be wetted, i.e. their action neutralized. Afterwards the liquids, A which have been fluidically separated from the liquid in the outlet reservoir, can be transported via the capillary stops 9 into the reaction chambers of the third channel system. Transport takes place advantageously by the action of capillarity, likewise however transport is also possible as a result of the action of pressure—whether an overpressure or a negative pressure. The metered liquids A then react in the reaction chambers with the reagents, which are located there, by which the desired product is formed.

The way in which the different capillarity of the individual channel systems or the individual sections in the channel systems are produced is known to one with pertinent skill in the art. For example, different cross sectional areas of the cavities and grooves can be decisive for the capillarity. Edges, corners, or the like are possibilities for how the capillarity can be set. Furthermore, absorbent materials can be placed in the cavities and upon contact with the liquid absorb it at high speed.

Likewise there are various possibilities for how the capillary stops 9 can be produced. One of them is simple widening of the cross section of the channel system. At this point then the capillarity would be reduced, by which the liquid flow stops. Providing hydrophobic or rough surfaces in the channels to achieve stoppage of the liquid is likewise known.

What is claimed is:

1. A microfluidic arrangement, for metering first metered amounts of liquid (A) and for separating the latter from a second amount of liquid (B) via a gaseous phase, comprising:
  a first channel and second channels;
  the first channel has one inlet and one outlet;
  in the area of the outlet, the arrangement has a capillarity, which is greater than or equal to the capillarity in the area of the inlet, whereby the capillarity moves an amount of fluid in the first channel from its inlet to its outlet;
  each second channel branches off from the first channel at a branch point, the branch points located sequentially along the first channel;
  each of said second channels provided with an outlet;
  each second channel having a predetermined volume forming an individual and discrete fluidic flow path with an individual fluidic outlet;
  the second channels have a greater capillary force than the first channel at the branch points;
  a plurality of third channels each provided with an inlet and outlet, each of said third channels situated downstream from one of said second channels;
  a stopping means provided between the outlet of each of said second channels and the inlet of each of said third channels; and
  said first channel, said second channels and said third channels all provided on the same planar surface.

2. The microfluidic arrangement in accordance with claim 1, further including a reservoir directly adjacent to and in fluid communication with said first channel, said reservoir provided on the same planar surface as said first channel, said second channels and said third channels.

3. A microfluidic arrangement, for metering first metered amounts of liquid (A) and for separating the latter from a second amount of liquid (B) via a gaseous phase, comprising:
  a first channel and second channels;
  the first channel has one inlet and one outlet;
  in the area of the outlet, the arrangement has a capillarity, which is greater than or equal to the capillarity in the area of the inlet, whereby the capillarity moves an amount of fluid in the first channel from its inlet to its outlet;
  each second channel branches off from the first channel at a branch point, the branch points located sequentially along the first channel;
  at least one of said second channels begins at a branch point and ends at a means for stopping a liquid flow, and further wherein said at least one of said channels is divided into sections to form a second channel system, and further wherein the capillarity of said sections remains the same or increases from the branch points as far as said stopping means,
  each second channel having a predetermined volume forming an individual and discrete fluidic flow path with an individual fluidic outlet;
  the second channels have a greater capillary force than the first channel at the branch points;
  a plurality of third channels, each third channel connected to a separate stopping means, each of said third channels having a second outlet,
  wherein a second channel begins filling when the second channel connected to a preceding branch point is completely filled,
  further wherein liquid exiting the microfluidic arrangement after flowing through one of said second channels does not mix with fluid exiting the microfluidic arrangement through any of the other second channels; and
  said first channel, said second channels and said third channels all provided on the same planar surface.

4. The microfluidic arrangement as claimed in claim 3, wherein said second channels are provided with a first portion abutting said branch point and a second portion abutting said outlet of each of said second channels, and further wherein said second channels are provided with a section in the form of a recess, said recess having a width greater than the width of the first and second portions of said second channels, said recess provided between said first and second portions of said second channels.

5. The microfluidic arrangement in accordance with claim 3, further including a reservoir directly adjacent to and in fluid communication with said first channel, said reservoir provided on the same planar surface as said first channel, said second channels and said third channels.

6. The microfluidic arrangement in accordance with claim 4, further including a reservoir directly adjacent to and in fluid communication with said first channel, said reservoir provided on the same planar surface as said first channel, said second channels and said third channels.

7. A microfluidic arrangement provided on a surface for metering first metered amount of liquid (A) and for separating the latter from a second amount of liquid (B) via a gaseous phase, comprising:
- a first channel and second channels;
- the first channel has one inlet and one outlet;
- in the area of the outlet, the arrangement has a capillarity which is greater than or equal to the capillary force in the area of the inlet;
- each second channel branches off from the first channel at one branch point;
- the second channels have a greater capillary force than the first channel at the branch points;
- each of the second channels has a predetermined volume;
- each of the second channels begins at one of the branch points and ends at separate capillary stops;
- each of the second channels is divided into a first section, a second section, and a third section and form a second channel system;
- the first sections are made as grooves and thus form channels, the second sections are made as recesses, and the third sections are made as grooves and thus form channels;
- each of the first sections is connected to the first channel at one of the branch points;
- each of the second sections is connected to one of the first sections;
- each of the third sections is connected to the capillary stop of one of the second sections and discharges into one of a plurality of second outlets;
- a cover; and
- each of the first, second and third channels is arranged as grooves or troughs in a single planar surface, which is covered by the cover.

* * * * *